United States Patent [19]

Duff

[11] 4,152,822

[45] May 8, 1979

[54] APPARATUS FOR COMMUTATOR REPLACEMENT

[76] Inventor: Donald H. Duff, 35936 Leon, Livonia, Mich. 48150

[21] Appl. No.: 821,718

[22] Filed: Aug. 4, 1977

[51] Int. Cl.² ............................................. H02K 15/00
[52] U.S. Cl. ................................. 29/564.5; 29/401 F; 29/564.1; 29/597; 29/733; 29/736; 228/19; 228/56; 228/191
[58] Field of Search ................. 29/597, 733, 736, 762, 29/336, 564.1, 564.5, 401 D, 401 F; 228/191, 264, 19, 56; 140/105, 106

[56] References Cited

U.S. PATENT DOCUMENTS

| | | | |
|---|---|---|---|
| 1,670,984 | 5/1928 | Poole | 29/733 |
| 1,703,188 | 2/1929 | Elsey | 29/736 X |
| 1,800,566 | 4/1931 | Pabst | 29/762 |
| 2,264,703 | 12/1941 | Lenz | 29/597 |
| 3,130,286 | 4/1964 | Lenzi | 228/20 |
| 3,447,575 | 6/1969 | Johanson | 140/106 |
| 3,813,023 | 5/1974 | Auray et al. | 29/762 X |

*Primary Examiner*—Carl E. Hall

*Attorney, Agent, or Firm*—Gifford, Chandler, Van Ophem, Sheridan & Sprinkle

[57] ABSTRACT

A method and apparatus are provided for replacing a commutator on a starter armature in which radially extending, circumferentially spaced commutator contact wires are interspaced between and soldered to mating contact wires on the armature. A heated platen includes at least one receiving hole through which the commutator is placed so that the soldered connection between the commutator and armature contact wires rests against the platen to thereby melt and remove the solder. The commutator is secured in a chuck while the armature is driven away from the stationary commutator. Thereafter, a novel tool spreads the rotor contact wires radially outwardly which permits a subsequent and new commutator to be positioned over the armature shaft so that the new commutator contact wires are interspaced between the armature contact wires. The contact wires between the new commutator and the armature are then soldered together by dipping the assembly into a solder pot heated by the platen.

8 Claims, 9 Drawing Figures

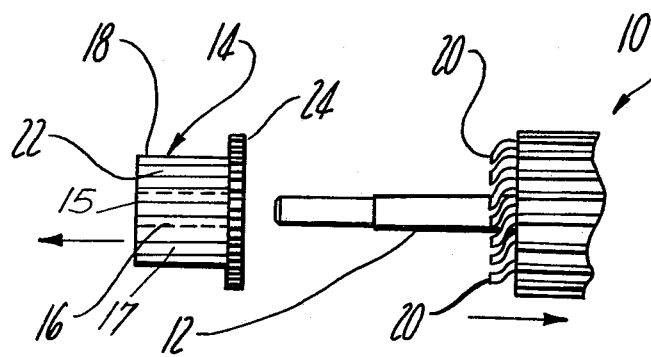
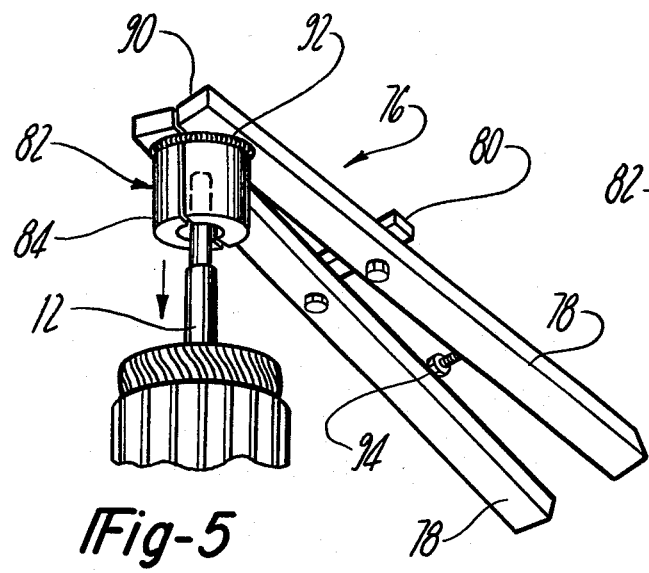
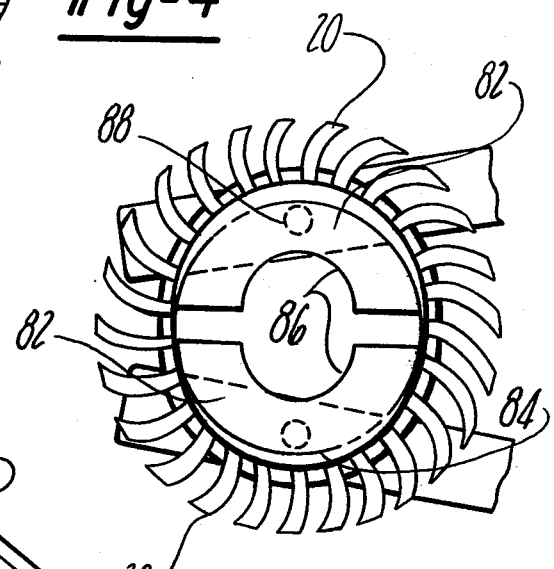
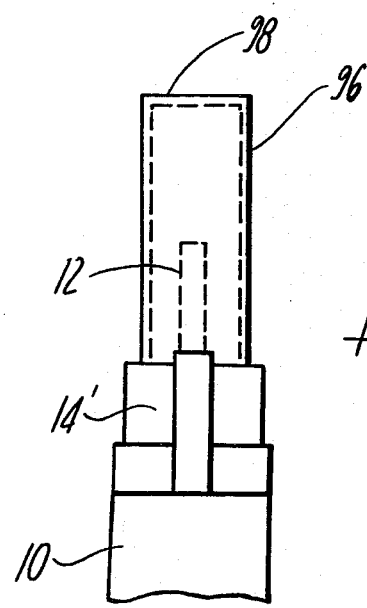
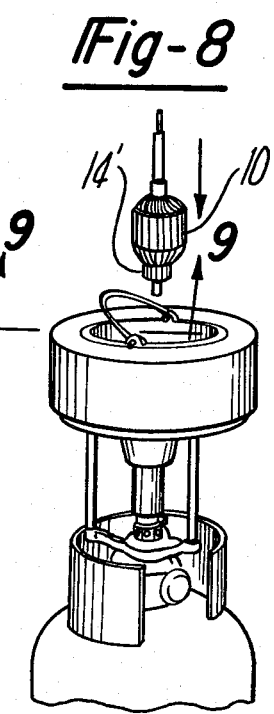
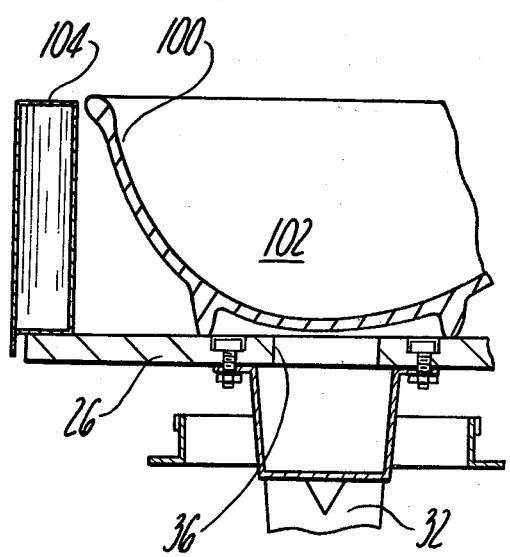

APPARATUS FOR COMMUTATOR REPLACEMENT

BACKGROUND OF THE INVENTION

I. Field of the Invention

The present invention relates to a method and apparatus for replacing commutators on a starter armature.

II. Description of the Prior Art

Commutators of the type employed on automotive starters, and the like are annular in shape and are disposed over a shaft. Each armature includes a plurality of circumferentially spaced and axially extending contact wires which extend radially outwardly at one end of the commutator. The radially outwardly extending portion of the commutator contact wires are interspaced and electrically connected to radially extending armature contact wires. Electrical brushes contact the axially extending portion of the commutator contact wires to provide the electrical connection between the brushes and the armature.

After long usage of the armature, however, the axially extending portion of the commutator wear out, both through friction and electrical gapping or sparks between the brushes and the commutator. The deterioration of the commutator is further increased by the so-called plastic type commutator which is commonly used by the automotive industry due to its low cost. The deterioration of the commutator, of course, renders the electrical device on which it is employed, inoperable.

Previously, the replacement of the commutator has been a time consuming and, therefore, expensive procedure. First, the old commutator was dipped into a solder pot in order to melt the solder between the commutator and armature contact wires. While effective, this procedure contaminated the solder within the pot and necessitated the disposal of a relatively large quantity of solder in the pot due to the contamination.

Moreover, no effective way has heretofore been known for simply and easily removing or pulling the old commutator from the armature shaft. Commonly, the commutator is yanked from the armature shaft with pliers or similar tools. This procedure, however, is time consuming particularly when the commutator is stuck on the armature shaft.

Thereafter, a new commutator is placed over the armature shaft. However, prior to doing so, the armature contact wires are manually and individually bent radially outwardly to permit the new commutator to be interspaced between the armature contact wires. In doing so, however, the armature contact wires are unevenly spaced and often circumferentially moved which requires realignment of the armature contact wires prior to the installation of a new commutator.

Once a commutator is finally positioned over the armature shaft, the assembly is dipped into a second and uncontaminated solder pot to electrically connect the commutator and armature contact wires. Thus, it can be seen that this previously known procedure requires two relatively expensive solder pots to complete the replacement of the commutator.

SUMMARY OF THE INVENTION

The present invention overcomes the above-mentioned disadvantages by providing a method and apparatus for simple replacement of the commutator for a starter motor, or the like.

There are several novel component parts and steps in the method and apparatus of the present invention. First, a platen is provided having at least one, and preferably a plurality, of receiving holes formed therethrough into which a commutator is positioned such that the contact portion of the contact wires for both the commutator and armature rest against the platen. The platen is heated by a propane torch or similar device which melts and even vaporizes the solder between the contact wires in order to permit the removal of the old commutator from the armature shaft. The heated platen is rapid and effective in operation and eliminates the requirement of the previously known solder pot for melting the solder.

After the solder between the commutator and armature contact wires has been dissipated, a novel stand according to the present invention is provided for removing the commutator from the armature shaft. In brief, the stand includes a chuck which clamps around the old commutator and maintains it stationary. Impact means, such as a pneumatic impact hammer, is also carried by the stand and engages the armature shaft to drive the armature shaft with the armature axially away from the commutator.

In order to spread the armature contact wires radially outwardly, a unique tool having a split movable jaw with outer semicircular surfaces and an axial throughbore is positioned over the shaft so that the armature shaft is positioned through the throughbore and so that the jaws are positioned radially inwardly from the armature contact wires. A manual handle moves the jaws radially apart so that the jaws engage the armature contact wires to simultaneously move all of the armature contact wires substantially evenly radially outwardly.

A new commutator is then positioned over the armature shaft so that the radially extending portion of the new commutator are interspaced between the armature contact wires. Although any means can be used to solder the commutator and armature contact wires together, a solder pot can be advantageously placed on and heated by the platen.

BRIEF DESCRIPTION OF THE DRAWINGS

A better understanding of the present invention will be had upon reference to the following detailed description when read in conjunction with the accompanying drawings wherein like reference characters refer to like parts throughout the several views, and in which:

FIG. 4 is a fragmentary side plan view illustrating the completed removal of the commutator from the armature shaft;

FIG. 5 is a fragmentary perspective view illustrating the method and apparatus for spreading the armature contact wires radially outwardly;

FIG. 6 is a fragmentary axial view illustrating both the method and apparatus of FIG. 5;

FIG. 7 is a fragmentary side plan view illustrating the insertion of the new commutator onto the armature shaft;

FIG. 8 is a fragmentary perspective view illustrating the soldering of the new commutator to the armature contact wires; and FIG. 9 is a fragmentary sectional view taken substantially along line 9—9 in FIG. 8 and enlarged for clarity.

DETAILED DESCRIPTION OF THE PRESENT INVENTION

Figure 1:
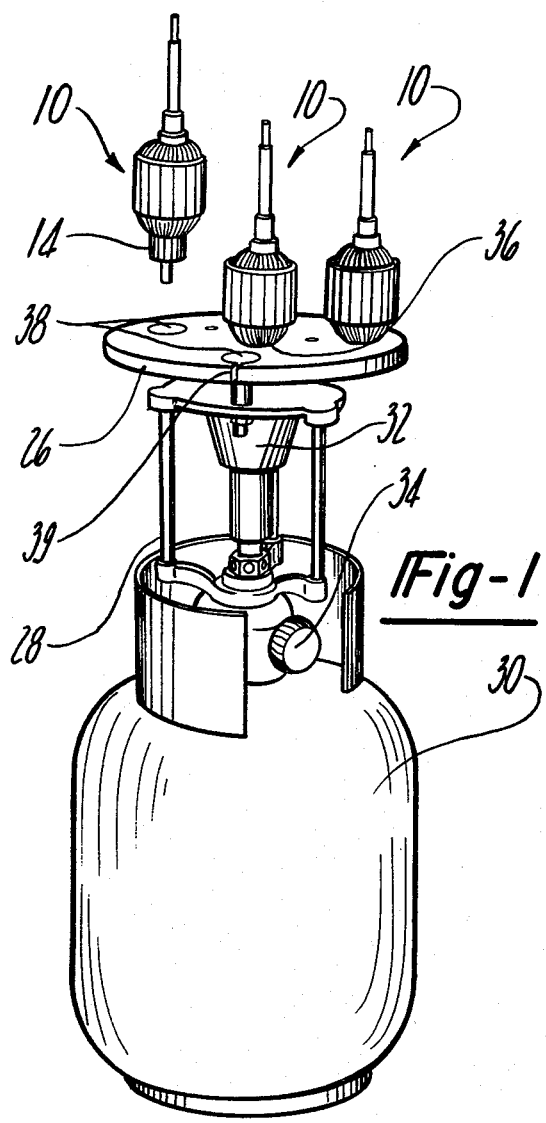
FIG. 1 is a side perspective view illustrating the method and apparatus for melting the solder between the old commutator and armature contact wires.

With reference first to FIGS. 1 and 4, a plurality of armatures 10 of an electrical device, such as a starter motor, electrical motor, or the like, are thereshown, each mounted to an armature shaft 12 and having a commutator 14 positioned at one end of the armature 10 and over the armature shaft 12. As is well known in the art, the commutator 14 is tubular and cylindrical in shape having an axial throughbore 16 through which the armature shaft 12 is received. In addition, the commutator 14 includes a plurality of slots 18 with contact wires 17 which are electrically connected to contact wires 20 formed on the armature 10. Moreover, each commutator contact wire 17 includes an axially extending portion 22 formed along the commutator housing 15 with a radially outwardly extending portion 24 at the inner axial end of the commutator 14. The commutator slots 18 are circumferentially spaced around the housing 15 and the radially outwardly extending portion 24 of the contact wires 17 mesh with the circumferentially spaced armature contact wires 20. In practice, the radially outwardly extending portion 24 of the commutator contact wires 17 are soldered to the armature contact wires 20 to complete the electrical connection between the commutator 14 and the armature 10.

With reference now particularly to FIG. 1, three armatures 10 are thereshown each having a commutator 14 at one end requires replacement. In order to achieve this, a circular platen 26 is mounted by a support structure 28 above a source 30 of flammable gas, such as propane gas. A burner 32 is carried by the support 28 and is selectively connected to the flammable gas source 30 by means of a control valve 34. With the gas valve 34 open and the burner 32 ignited, the flame strikes the platen 26 substantially centrally to thereby heat the platen 26 with the central portion of the platen 26 heated much more so than the outer edges.

The platen 26 includes a central aperture 36 and a plurality of circumferentially spaced outer apertures 38 formed therethrough. Each aperture 36 or 38 is designed to receive the commutator end of the armature 10 therethrough so that the radial portions 24 and 20 of both the commutator riser and armature contact wires flatly abut against and are heated by the platen 26. In addition, a thermal expansion slot 39 extends into each aperture 38.

Still referring to FIG. 1, the initial step of replacing the commutator 14 on the armature 10 is thereshown in which the solder between the commutator and armature contact wires is melted away from the assembly. More specifically, the armatures 10 with the attached commutators 14 are first placed in the outer apertures 38 in the platen 26 in order to preheat the soldered connection between the commutator and armature contact wires. After preheating, the armature 10 is transferred to the central aperture 36 in the platen 26, which, due to the high heat from the burner 32, rapidly melts and dissipates the solder connection between the commutator and armature contact wires. It should also be noted that by the provision of the multiple outer apertures 38 in platen 26, a plurality of armatures can be preheated simultaneously.

Figure 3:
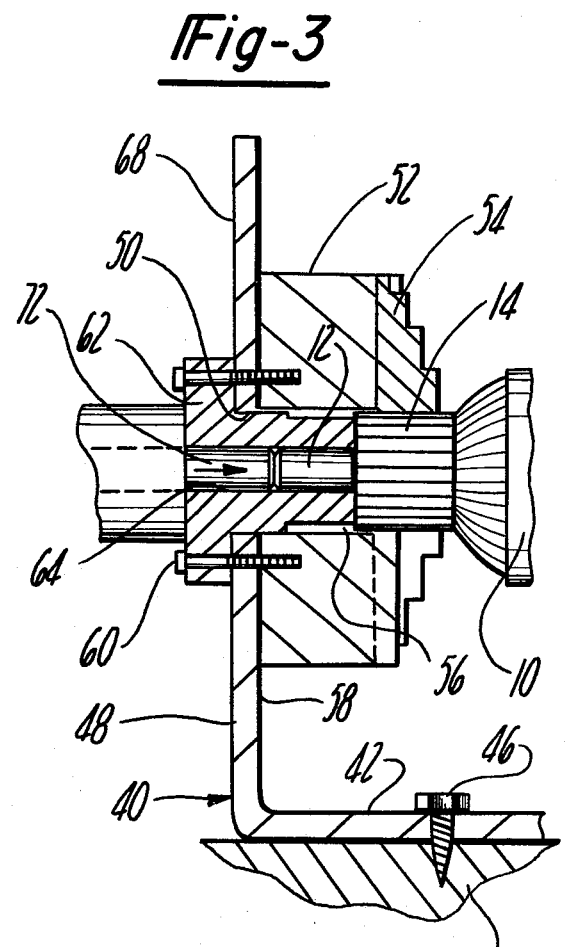
FIG. 3 is a fragmentary sectional view showing the method and apparatus of FIG. 2 and enlarged for clarity.
Figure 2:
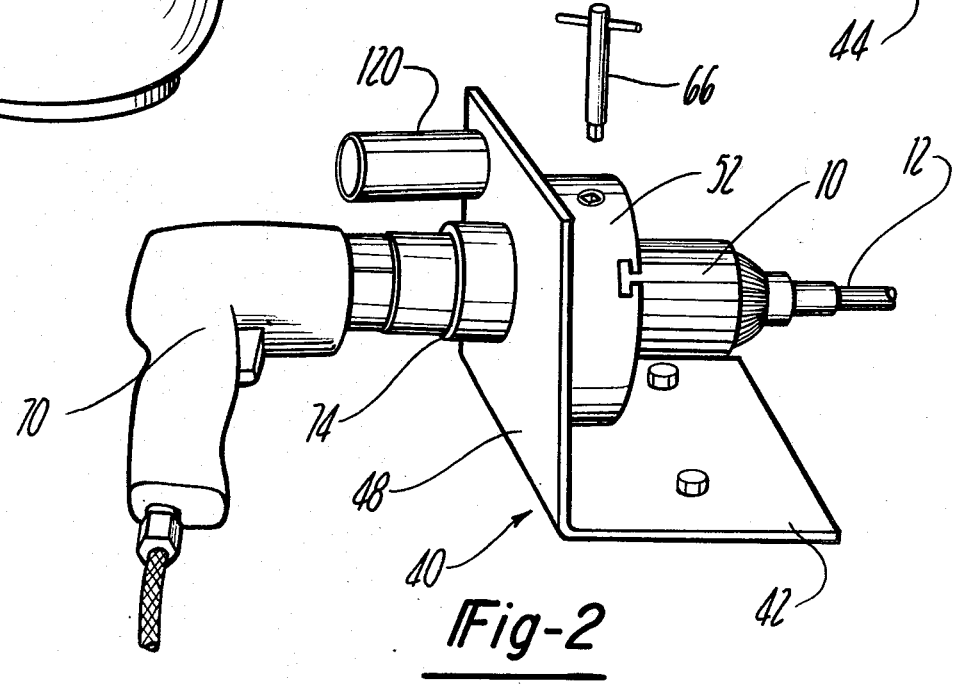
FIG. 2 is a side perspective view illustrating both the method and apparatus for removing the commutator from the armature shaft once the solder has been melted.

With reference now to FIGS. 2 and 3, a support stand 40 is thereshown for pulling the commutator 14 from the armature shaft 12 and wires following the initial desoldering step which has already been described. The support stand 40 comprises a lower portion 42 which is secured to a table 44 or other support structure by appropriate means 46 and an upwardly extending plate portion 48. The lower portion 42 and upper portion 48 of the stand 40 are preferably integral with each other. A relatively large diameter bore 50 is also provided through the upper portion 48 of the stand 40.

A chuck 52 having radially movable jaws 54 and an axial throughbore 56 is secured to one side of the upper plate portion 48 by bolts 60 or other appropriate means so that the chuck bore 56 is coaxial with the bore 50. The bolts 60 also secure an annular member 62 having an axial throughbore 64 of substantially the same diameter as the armature shaft 12 to the upper portion 48 of the stand 40 but on the side opposite from the chuck 52.

The chuck jaws 54 are dimensioned to receive the commutator 14 therethrough so that the armature shaft 12 extends into the axial bore 64 of the annular member 62. The chuck jaws 54 are then tightened against the commutator 14 by means of an appropriate key 66 to rigidly secure the commutator 14 to the support stand 40.

On the side 68 opposite from the side 58 of the stand upper portion 48, an air hammer 70 having an impact member 72 is secured by appropriate means 74 to the support stand 40 so that the impact member 72 extends into the throughbore 64 of the annular member 62. Thus, upon activation of the air hammer 70, or other appropriate impact means, the impact member 72 contacts the axial end of the armature shaft 12 and drives the armature 10 through and axially away from the commutator 14 thus removing the commutator 14 from the armature shaft wires 10. It will, of course, also be appreciated that it may be necessary to employ appropriate adapters for connecting the air hammer 70 to the stand 40 for accommodating armature shafts 12 of different lengths.

With reference now to FIGS. 5 and 6, it is desirable to spread the armature contact wires 20 radially outwardly in order to facilitate the installation of a new commutator. For this purpose, a tool 76 is provided having a pair of elongated hand gripping portions 78 which are pivotally secured together at a midpoint by a crossbar 80. A head 82 having a semicircular outer periphery 84 and an inner semicircular groove 86 is pivotally secured at 88 to one end 90 of each handle 78 so that the heads 82 face each other. A circular spring 92 is positioned around both heads 82 to urge the heads 82 together in a self-centering fashion whereby the outer periphery of the heads 82 is substantially circular while the grooves 86 form a circular throughbore coaxial with the outer periphery 84 of the heads 82.

In order to spread the armature contact wires 20 radially outwardly, the heads 82 of the tool 76 are coaxially positioned over the armature shaft 12 so that the shaft 12 is received through the semicircular grooves 86 while the outer periphery 84 of the head 82 is positioned radially interiorly of the armature contact wires 20. The subsequent compression of the other end of the handle 78 together forces the heads 82 radially outwardly which engages the armature contact wires 20 to likewise bend them slightly radially outwardly. A stop nut 94 secured to one handle 78 limits the outward expansion of the armature contact wires 20.

With reference now to FIG. 7, a new commutator 14' is then driven onto the armature shaft 12 by means of a commutator set 96 so that the new commutator slots 24 are interspaced between and contact the armature contact wires 20. The commutator set 96 is of conventional construction and is elongated, tubular and cylindrical in shape having an upper closed end 98. Once the new commutator 14 is attached to the armature 10, the armature contact wires 20 are preferably staked in the conventional fashion in the new commutator slots.

With reference back to FIG. 2, the stand 40 can also be used to insert a new commutator onto the armature shaft 12. For this purpose, a second tubular extension 120 adapted to receive the impact means 70 is secured to the stand upper position 48. Then with a new commutator secured by the chuck 52 the impact means 70 impacts against and vibrates the stand 40 which permits the armature 10 to be hand fed onto the new commutator.

With reference now to FIGS. 8 and 9, after conventionally applying flux to the commutator, the commutator is soldered to the armature contact wires. To achieve this, a solder pot 100 can advantageously be placed on the platen 26 so that the burner 32 heats the pot 100 through the aperture 36 in the platen 26 to melt solder 102 within the pot 100. For more efficient melting of the solder 102 within the pot 100, a cylindrical tubular heat shield 104 is positioned on the platen 26 and around the pot 100. The annular heat shield 104 maintains the heat loss from the solder pot 100 at a minimum so that the solder 102 is efficiently and substantially uniformly heated. To solder the commutator onto the armature, the commutator is dipped into the solder 102 in the solder pot 100 in the conventional fashion. After removal from the solder pot 100, the armature with its new commutator 14', after final cleaning, is ready for reinstallation in the electrical device from which it came.

From the foregoing, it can be seen that the method and apparatus for commutator replacement according to the present invention can be rapidly and, therefore, efficiently obtained. Moreover, by employing the heated platen rather than a solder pot to desolder the old commutator from the armature, the previously known contaminated solder and its wasteful disposal has been eliminated.

Having described my invention, however, many modifications thereto will become apparent to those skilled in the art to which it pertains without deviating from the spirit of the invention as defined by the scope of the appended claims.

I claim:

1. A kit for replacing a commutator having contact wires which abut against and are soldered to mating contact wires on an armature having a shaft, said kit comprising a platen having means for holding said commutator when attached to the armature,
    means for heating the platen to thereby melt the solder,
    means for removing the commutator from the armature shaft and wires,
    means for spreading the armature contact wires radially outwardly,
    means for positioning a new commutator on said armature over said shaft, said new commutator having a radially outwardly extending slotted portion with electrical contact wires, so that the slotted portion of the new commutator is interspaced between the armature contact wires, and
    means for soldering the new commutator to the armature contact wires wherein said spreading means further comprises a tool having two elongated handles pivotally secured together at a midpoint, a head mounted to the adjacent ends of each handle, each head having a substantially semicircular outer and inner periphery, said heads being in a facing relationship whereby the armature shaft can be received through the bore formed by the inner periphery of the heads so that the outer periphery of the heads are spaced radially inwardly from the armature contact wires.

2. The invention as defined in claim 1 wherein said platen further includes a central aperture and at least one outer aperture, the apertures for receiving commutators therein and wherein said heating means further comprises a burner connected to a source of flammable gas, said burner being positioned underneath said central aperture in said platen.

3. The invention as defined in claim 1 wherein said removing means further comprises a stand having an aperture formed therethrough, a chuck attached to said stand coaxially with said aperture which clampingly engages the commutator, and impact means secured to said stand coaxially with said aperture, said impact means having an impact member in registration with said armature shaft for driving said armature axially through and away from the commutator.

4. The invention as defined in claim 1 wherein said heads are pivotally mounted to said handles and including means for resiliently urging said heads together so that the inner and outer periphery of one head is substantially coaxial with the inner and outer periphery respectively, of the other head.

5. The invention as defined in claim 1 wherein said soldering means comprises a pot positioned on said platen.

6. The invention as defined in claim 5 and including a cylindrical tubular heat shield positioned on said platen and around said pot.

7. The invention as defined in claim 3 wherein said positioning means further comprises means for holding said impact means at position radially spaced from said aperture whereby said impact means vibrates said stand which, when a new commutator is secured by the chuck, vibration feeds the armature shaft into and through the new commutator.

8. A kit for replacing a commutator having contact wires which abut against and are soldered to mating contact wires on an armature having a shaft, said kit comprising a platen having means for holding said commutator when attached to the armature,
    means for heating the platen to thereby melt the solder,
    means for removing the commutator from the armature shaft and wires,
    means for spreading the armature contact wires radially outwardly,
    means for positioning a new commutator on said armature over said shaft, said new commutator having a radially outwardly extending slotted portion with electrical contact wires, so that the slotted portion of the new commutator is interspaced between the armature contact wires, and means for soldering the new commutator to the armature contact wires, wherein said platen further includes a central aperture and at least one outer aperture, the apertures for receiving commutators therein and wherein said heating means further comprises a burner connected to a source of flammable gas, said burner being positioned underneath said central aperture in said platen and wherein said soldering means comprises a pot at least partially filled with solder, said pot being positioned on said platen.

* * * * *